US012664463B2

(12) United States Patent
Mrini et al.

(10) Patent No.: US 12,664,463 B2
(45) Date of Patent: Jun. 23, 2026

(54) MULTITASK MACHINE-LEARNING MODEL TRAINING AND TRAINING DATA AUGMENTATION

(71) Applicant: Adobe Inc., San Jose, CA (US)

(72) Inventors: Khalil Mrini, La Jolla, CA (US); Franck Dernoncourt, Spokane, WA (US); Seunghyun Yoon, San Jose, CA (US); Trung Huu Bui, San Jose, CA (US); Walter W. Chang, San Jose, CA (US); Emilia Farcas, San Diego, CA (US); Ndapandula T. Nakashole, Del Mar, CA (US)

(73) Assignee: Adobe Inc., San Jose, CA (US)

( * ) Notice: Subject to any disclaimer, the term of this patent is extended or adjusted under 35 U.S.C. 154(b) by 902 days.

(21) Appl. No.: 17/846,428

(22) Filed: Jun. 22, 2022

(65) Prior Publication Data

US 2023/0419164 A1 Dec. 28, 2023

(51) Int. Cl.
*G06F 7/00* (2006.01)
*G06N 20/00* (2019.01)

(52) U.S. Cl.
CPC ................................... *G06N 20/00* (2019.01)

(58) Field of Classification Search
CPC ..................................................... G06N 20/00
USPC .................................... 707/600–899; 706/12
See application file for complete search history.

(56) References Cited

U.S. PATENT DOCUMENTS

2021/0279511 A1* 9/2021 Gordon .................. G06N 3/084
2022/0051059 A1* 2/2022 Shang ................. G06F 18/2155

OTHER PUBLICATIONS

Abacha, Asma Ben , et al., "A question-entailment approach to question answering", BMC Bioinformatics [retrieved Apr. 27, 2022]. Retrieved from the Internet <https://web.archive.org/web/20200211002816id_/https://bmcbioinformatics.biomedcentral.com/track/pdf/10.1186/s12859-019-3119-4>., Oct. 22, 2019, 23 Pages.
Abacha, Asmaben , et al., "MEANS: A medical question-answering system combining NLP techniques and semantic Web technologies", Information Processing & Management, vol. 51, No. 5 [retrieved Apr. 27, 2022]. Retrieved from the Internet <https://www.sciencedirect.com/science/article/abs/pii/S0306457315000515>., Sep. 2015, 25 Pages.

(Continued)

*Primary Examiner* — Isaac M Woo
(74) *Attorney, Agent, or Firm* — FIG. 1 Patents

(57) ABSTRACT

Multitask machine-learning model training and training data augmentation techniques are described. In one example, training is performed for multiple tasks simultaneously as part of training a multitask machine-learning model using question pairs. Examples of the multiple tasks include question summarization and recognizing question entailment. Further, a loss function is described that incorporates a parameter sharing loss that is configured to adjust an amount that parameters are shared between corresponding layers trained for the first and second tasks, respectively. In an implementation, training data augmentation techniques are also employed by synthesizing question pairs, automatically and without user intervention, to improve accuracy in model training.

21 Claims, 8 Drawing Sheets

400

402
Generate a second augmented dataset for a second task

404
Obtain a first dataset having question pairs relating to a first task

406
Select an input question pair from the first dataset

408
Determine whether a synthetic question pair for a second dataset is to be labeled as entailment or not entailment 410
Responsive to a determination that the synthetic question pair is to be labeled as entailment, generate the synthetic question pair for the second augmented dataset as matching the input question pair 412
Responsive to a determination that the synthetic question pair is to be labeled as not entailment, generate the synthetic question pair for the second augmented dataset as including a first question from the first dataset taken from the input question pair and a second question randomly selected from the second dataset 414
Output the second augmented dataset for training a machine-learning model

(56)          References Cited

OTHER PUBLICATIONS

Abacha, Asma Ben , et al., "NLM_NIH at SemEval-2017 Task 3: from Question Entailment to Question Similarity for Community Question Answering", Proceedings of the 11th International Workshop on Semantic Evaluation [retrieved Apr. 27, 2022]. Retrieved from the Internet <https://aclanthology.org/S17-2057.pdf>., Aug. 2017, 4 Pages.

Abacha, Asma Ben , et al., "Overview of the MEDIQA 2019 Shared Task on Textual Inference, Question Entailment and Question Answering", Proceedings of the 18th BioNLP Workshop and Shared Task [retrieved Apr. 27, 2022]. Retrieved from the Internet <https://aclanthology.org/W19-5039.pdf>., Aug. 2019, 10 pages.

Abacha, Asma Ben , et al., "Recognizing Question Entailment for Medical Question Answering", AMIA 2016 Annual Symposium [retrieved Apr. 27, 2022]. Retrieved from the Internet <https://Ihncbc.nlm.nih.gov/LHC-publications/PDF/pub9500.pdf>., Feb. 10, 2017, 9 Pages.

Agrawal, Anumeha , et al., "ARS_NITK at MEDIQA 2019:Analysing Various Methods for Natural Language Inference, Recognising Question Entailment and Medical Question Answering System", Proceedings of the 18th BioNLP Workshop and Shared Task [retrieved Apr. 27, 2022]. Retrieved from the Internet <https://aclanthology.org/W19-5059.pdf>., Aug. 2019, 8 Pages.

Alsentzer, Emily , et al., "Publicly Available Clinical BERT Embeddings", Cornell University arXiv, arXiv.org [retrieved Apr. 27, 2022]. Retrieved from the Internet <https://arxiv.org/pdf/1904.03323.pdf>., Jun. 20, 2019, 7 Pages.

Bar-Haim, Roy , et al., "The Second PASCAL Recognising Textual Entailment Challenge", Computer Science Department, Bar-Ilan University [retrieved Apr. 27, 2022]. Retrieved from the Internet <http://citeseerx.ist.psu.edu/viewdoc/download?doi=10.1.1.60.8552&rep=rep1&type=pdf>., Jan. 2006, 9 Pages.

Beltagy, IZ , et al., "SciBERT: A Pretrained Language Model for Scientific Text", Cornell University arXiv, arXiv.org [retrieved Apr. 27, 2022]. Retrieved from the Internet <https://arxiv.org/pdf/1903.10676.pdf>., Sep. 10, 2019, 6 Pages.

Bentivogli, Luisa , et al., "The Sixth PASCAL Recognizing Textual Entailment Challenge", TAC [retrieved Apr. 27, 2022]. Retrieved from the Internet <https://tac.nist.gov/publications/2010/additional.papers/RTE6_overview.proceedings.pdf>., 2010, 18 Pages.

Bowman, Samuel R, "A large annotated corpus for learning natural language inference", Cornell University arXiv, arXiv.org [retrieved Apr. 27, 2022]. Retrieved from the Internet <https://arxiv.org/pdf/1508.05326.pdf>., Aug. 21, 2015, 11 Pages.

Cai, Ruichu , et al., "An CNN-LSTM Attention Approach to Understanding User Query Intent from Online Health Communities", IEEE International Conference on Data Mining Workshops (ICDMW) [retrieved Apr. 27, 2022]. Retrieved from the Internet <10.1109/ICDMW.2017.62>., Nov. 2017, 8 Pages.

Chen, Shu , et al., "MedDialog: A Large-scale Medical Dialogue Dataset", Proceedings of the 2020 Conference on Empirical Methods in Natural Language Processing (EMNLP) [retrieved Apr. 27, 2022]. Retrieved from the Internet <https://pengtaoxie.github.io/meddiag.pdf>., Nov. 2020, 4 Pages.

Chen, Long , et al., "Understanding user intent in community question answering", WWW '12 Companion: Proceedings of the 21st International Conference on World Wide Web [retrieved Apr. 27, 2022. Retrieved from the Internet <https://www2012.universite-lyon.fr/proceedings/companion/p823.pdf>., Apr. 2012, 6 pages.

Dagan, Ido , et al., "Recognizing Textual Entailment: Models and Applications", Synthesis Lectures on Human Language Technologies [retrieved Apr. 27, 2022]. Retrieved from the Internet <https://web.archive.org/web/20170829065719id_/https://aclweb.org/anthology/J/J15/J15-1008.pdf>., Jul. 2013, 4 Pages.

Dagan, Ido , et al., "The PASCAL Recognising Textual Entailment Challenge", Machine Learning Challenges Workshop [retrieved Apr. 27, 2022]. Retrieved from the Internet <https://citeseerx.ist.psu.edu/viewdoc/download?doi=10.1.1.295.4483&rep=rep1&type=pdf>., Apr. 2005, 14 Pages.

Demner-Fushman, Dina , et al., "Consumer health information and question answering: helping consumers find answers to their health-related information needs", Journal of the American Medical Informatics Association [retrieved Apr. 27, 2022]. Retrieved from the Internet <https://nsftlib.kums.ac.ir/kums_content/media/image/2021/04/155322_orig.pdf>., Oct. 8, 2019, 8 Pages.

Devlin, Jacob , et al., "BERT: Pre-Training of Deep Bidirectional Transformers for Language Understanding", Cornell University, arXiv Preprint, arXiv.org [retrieved on Aug. 17, 2022]. Retrieved from the Internet <https://arxiv.org/pdf/1810.04805.pdf>., May 24, 2019, 16 pages.

Giampiccolo, Danilo , et al., "The Third PASCAL Recognizing Textual Entailment Challenge", RTE '07: Proceedings of the ACL-PASCAL Workshop on Textual Entailment and Paraphrasing [retrieved Apr. 27, 2022]. Retrieved from the Internet <https://aclanthology.org/W07-1401.pdf>., Jun. 2007, 9 Pages.

Groenen, Jeroen Antonius Gerardus , et al., "Studies on the Semantics of Questions and the Pragmatics of Answers", Ph.D. thesis, Institutional Repository of the University of Amsterdam [retrieved Apr. 27, 2022]. Retrieved from the Internet <https://pure.mpg.de/rest/items/item_405442/component/file_405441/content>., 1984, 577.

Guo, Han , et al., "Soft Layer-Specific Multi-Task Summarization with Entailment and Question Generation", Cornell University arXiv, arXiv.org [retrieved Apr. 27, 2022]. Retrieved from the Internet <https://arxiv.org/pdf/1805.11004.pdf>., May 28, 2018, 16 Pages.

Gupta, Anand , et al., "Text Summarization through Entailment-based Minimum Vertex Cover", Proceedings of the Third Joint Conference on Lexical and Computational Semantics [retrieved Apr. 27, 2022]. Retrieved from the Internet <https://aclanthology.org/S14-1010.pdf>., Aug. 2014, 6 Pages.

Huang, Kexin , et al., "ClinicalBERT: Modeling Clinical Notes and Predicting Hospital Readmission", Cornell University arXiv, arXiv.org [retrieved Apr. 27, 2022]. Retrieved from the Internet <https://arxiv.org/pdf/1904.05342.pdf>., Nov. 29, 2020, 9 Pages.

Iyer, Shankar , et al., "First Quora Dataset Release: Question Pairs", Quora, Inc. [retrieved May 9, 2022]. Retrieved from the Internet <https://quoradata.quora.com/First-Quora-Dataset-Release-Question-Pairs>., 3 Pages.

Johnson, Alistair , et al., "MIMIC-III, a freely accessible critical care database", Scientific Data [retrieved Apr. 27, 2022]. Retrieved from the Internet <https://www.nature.com/articles/sdata201635.pdf>., May 24, 2016, 9 Pages.

Lee, Jinhyuk , et al., "Article Navigation BioBERT: a pre-trained biomedical language representation model for biomedical text mining", Bioinformatics, vol. 36, No. 4 [retrieved Apr. 27, 2022]. Retrieved from the Internet <https://arxiv.org/ftp/arxiv/papers/1901/1901.08746.pdf>, Feb. 15, 2020, 7 Pages.

Lei, Chuan , et al., "Expanding Query Answers on Medical Knowledge Bases", EDBT 2020 Conference paper [retrieved Apr. 27, 2022]. Retrieved from the Internet <https://openproceedings.org/2020/conf/edbt/paper_351.pdf>., 2020, 12 Pages.

Lewis, Mike , et al., "BART: Denoising Sequence-to-Sequence Pre-training for Natural Language Generation, Translation, and Comprehension", Cornell University arXiv, arXiv.org [retrieved Apr. 28, 2022]. Retrieved from the Internet <https://arxiv.org/pdf/1910.13461.pdf>., Oct. 29, 2019, 10 Pages.

Li, Haoran , et al., "Ensure the Correctness of the Summary: Incorporate Entailment Knowledge into Abstractive Sentence Summarization", Proceedings of the 27th International Conference on Computational Linguistics [retrieved Apr. 2, 2022]. Retrieved from the Internet <https://aclanthology.org/C18-1121.pdf>., Aug. 2018, 12 Pages.

Lin, Chin-Yew , "Rouge: A Package for Automatic Evaluation of Summaries", Information Sciences Institute Jniversity of Southern California [retrieved Apr. 2, 2022]. Retrieved from the Internet <https://aclanthology.org/W04-1013.pdf>., Jul. 25, 2004, 8 pages.

Liu, Xiaodong , et al., "Multi-Task Deep Neural Networks for Natural Language Understanding", Cornell University arXiv, arXiv.

(56) References Cited

OTHER PUBLICATIONS org [retrieved Apr. 2, 2022]. Retrieved from the Internet <https://arxiv.org/pdf/1901.11504.pdf>., May 30, 2019, 10 pages.

Lloret, Elena , et al., "A Text Summarization Approach under the Influence of Textual Entailment", Natural Language Processing and Information Systems Group Department of Software and Computing Systems University of Alicante [retrieved Apr. 2, 2022]. Retrieved from the Internet <https://www.dlsi.ua.es/~elloret/publications/elloretICEIS08.pdf>., Jun. 2008, 10 pages.

Mccreery, Clara , et al., "Domain-Relevant Embeddings for Medical Question Similarity", Cornell University arXiv, arXiv.org [retrieved Apr. 2, 2022]. Retrieved from the Internet <https://arxiv.org/pdf/1910.04192.pdf>., Nov. 15, 2019, 6 Pages.

Mehdad, Yashar , et al., "Abstractive Meeting Summarization with Entailment and Fusion", Proceedings of the 14th European Workshop on Natural Language Generation [retrieved Apr. 2, 2022]. Retrieved from the Internet <https://aclanthology.org/W13-2117.pdf>., Aug. 2013, 11 Pages.

Mrini, Khalil , et al., "Joint Summarization-Entailment Optimization for Consumer Health Question Understanding", Proceedings of the Second Workshop on Natural Language Processing for Medical Conversations [retrieved Apr. 2, 2022]. Retrieved from the Internet <https://aclanthology.org/2021.nlpmc-1.8.pdf>., Jun. 2021, 8 Pages.

Mrini, Khalil , et al., "UCSD-Adobe at MEDIQA 2021: Transfer Learning and Answer Sentence Selection for Medical Summarization", Proceedings of the 20th Workshop on Biomedical Language Processing [retrieved Apr. 2, 2022]. Retrieved from the Internet <https://aclanthology.org/2021.bionlp-1.28.pdf>., Jun. 2021, 6 Pages.

Nallapati, Ramesh , et al., "Abstractive Text Summarization using Sequence-to-sequence RNNs and Beyond", Proceedings of The 20th SIGNLL Conference on Computational Natural Language Learning [retrieved Apr. 2, 2022]. Retrieved from the Internet <https://aclanthology.org/K16-1028.pdf>., Aug. 26, 2016, 12 pages.

Narayan, Shashi , et al., "Don't Give Me the Details, Just the Summary! Topic-Aware Convolutional Neural Networks for Extreme Summarization", Cornell University arXiv, arXiv.org [retrieved Apr. 2, 2022]. Retrieved from the Internet <https://arxiv.org/pdf/1808.08745.pdf>., Aug. 27, 2018, 11 Pages.

Pasunuru, Ramakanth , et al., "Multi-Reward Reinforced Summarization with Saliency and Entailment", Cornell University arXiv, arXiv.org [retrieved Apr. 2, 2022]. Retrieved from the Internet <https://arxiv.org/pdf/1804.06451.pdf>., May 29, 2018, 9 Pages.

Pasunuru, Ramakanth , et al., "Towards Improving Abstractive Summarization via Entailment Generation", Proceedings of the Workshop on New Frontiers in Summarization [retrieved Apr. 2, 2022]. Retrieved from the Internet <https://aclanthology.org/W17-4504.pdf>., Sep. 2017, 6 Pages.

Rajpurkar, Pranav , et al., "SQuAD: 100,000+ Questions for Machine Comprehension of Text", Cornell University arXiv, arXiv.org [retrieved Apr. 2, 2022]. Retrieved from the Internet <https://arxiv.org/pdf/1606.05250.pdf>., Oct. 11, 2016, 10 pages.

Roberts, Craige , "Information structure in discourse: Towards an integrated formal theory of pragmatics", Semantics & Pragmatics vol. 5, No. 6 [retrieved Apr. 2, 2022]. Retrieved from the Internet <https://www.asc.ohio-state.edu/roberts.21/LSA/Roberts.InfoStr.2012.pdf>., Dec. 19, 2012, 69 Pages.

See, Abigail , et al., "Get To The Point: Summarization with Pointer-Generator Networks", Cornell University arXiv, arXiv.org [retrieved Apr. 2, 2022]. Retrieved from the Internet <https://arxiv.org/pdf/1704.04368.pdf>., Apr. 25, 2017, 20 pages.

Wang, Alex , et al., "GLUE: A Multi-Task Benchmark and Analysis Platform for Natural Language Understanding", Cornell University arXiv, arXiv.org [retrieved Apr. 2, 2022]. Retrieved from the Internet <https://arxiv.org/pdf/1804.07461.pdf>., Feb. 22, 2019, 13 pages.

Yan, Guokai , et al., "Medical Question Similarity Calculation Based On Weighted Domain Dictionary", ICBDC '18: Proceedings of the 2018 International Conference on Big Data and Computing [retrieved Apr. 2, 2022]. Retrieved from the Internet <https://doi.org/10.1145/3220199.3220226>., Apr. 28, 2018, 104 Pages.

Zhou, Huiwei , et al., "DUT-NLP at MEDIQA 2019: An Adversarial Multi-Task Network to Jointly Model Recognizing Question Entailment and Question Answering", Proceedings of the 18th BioNLP Workshop and Shared Task [retrieved Apr. 2, 2022]. Retrieved from the Internet <https://aclanthology.org/W19-5046.pdf>., Aug. 2019, 9 Pages.

Zhu, Wei , et al., "PANLP at MEDIQA 2019: Pre-trained Language Models, Transfer Learning and Knowledge Distillation", Proceedings of the 18th BioNLP Workshop and Shared Task [retrieved Apr. 2, 2022]. Retrieved from the Internet <https://aclanthology.org/W19-5040.pdf>., Aug. 2019, 9 Pages.

* cited by examiner

100

122

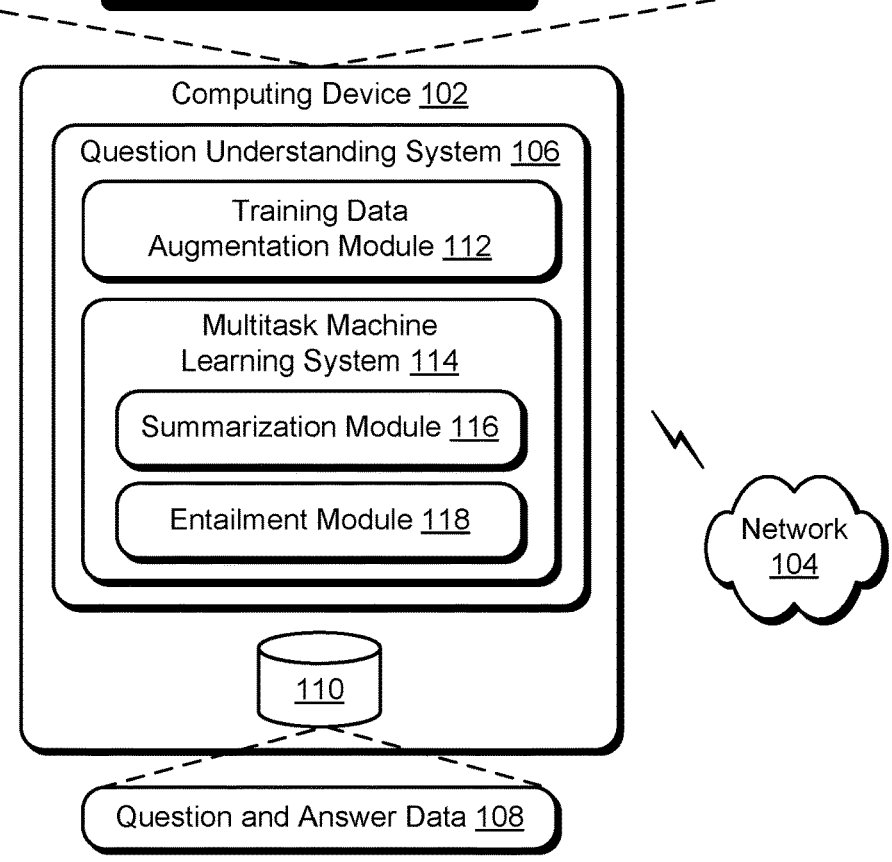

Input                                                    120
SUBJECT: Morgellon Disease
MESSAGE:   It appears as if I have had this horrible disease for many, many years and it is getting worse.  I am trying to find a physician or specialist in the North Carolina area who can treat me for this medical/mental disease.   It seems as if this disease has no complete treatment and it probably involves a long term disability.

RESULT
Where can I find a physician or specialist in North Carolina who can treat Morgellon Disease?

Computing Device 102

Question Understanding System 106

Training Data
Augmentation Module 112

Multitask Machine
Learning System 114

Summarization Module 116

Entailment Module 118

110

Network
104

Question and Answer Data 108

Fig. 1

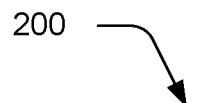
200
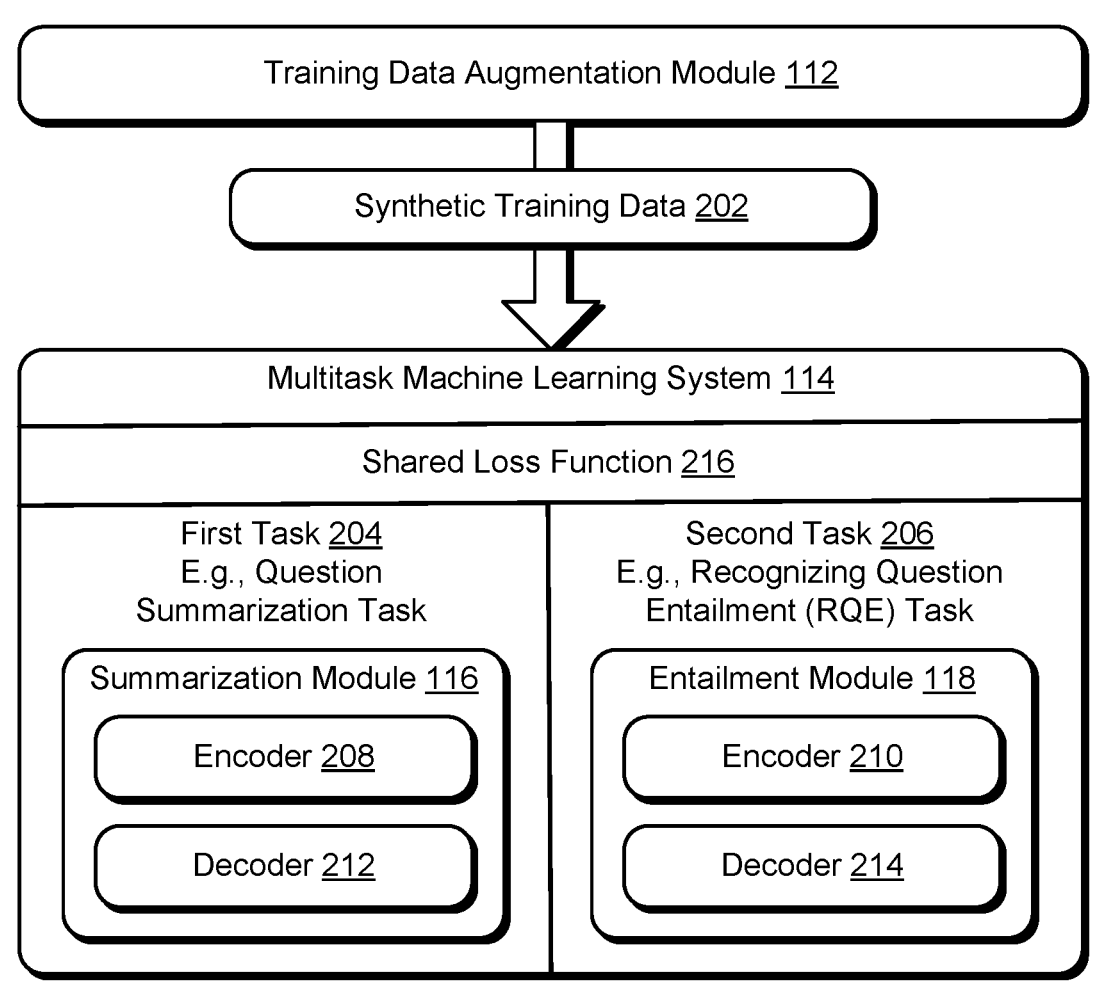
Fig. 2

300

Input Dataset 302
(e.g., First Task)

Training Data Augmentation Module 112

Input Pair 306
(e.g., First Task)

Synthetic Task Generation Module 308
(e.g., Second Task)

Synthetic Pair 310
(e.g., Second Task)

Augmented Dataset 304
(e.g., Second Task)

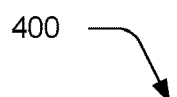

400

---

402
Generate a second augmented dataset for a second task

> 404
> Obtain a first dataset having question pairs relating to a first task > 406
> Select an input question pair from the first dataset > 408
> Determine whether a synthetic question pair for a second dataset is to be labeled as entailment or not entailment > 410
> Responsive to a determination that the synthetic question pair is to be labeled as entailment, generate the synthetic question pair for the second augmented dataset as matching the input question pair > 412
> Responsive to a determination that the synthetic question pair is to be labeled as not entailment, generate the synthetic question pair for the second augmented dataset as including a first question from the first dataset taken from the input question pair and a second question randomly selected from the second dataset

414
Output the second augmented dataset for training a machine-learning model

Fig. 4

500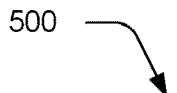

502
Generate a first augmented dataset for a first task

504
Obtain a second dataset having question pairs relating to a second task

506
Select an input question pair from the second dataset

508
Determine whether a synthetic question pair for a first dataset is to be labeled as entailment or not entailment

510
Responsive to a determination that the synthetic question pair is to be labeled as entailment, generate the synthetic question pair for the first augmented dataset as matching the input question pair

512
Responsive to a determination that the synthetic question pair is to be labeled as not entailment, generate the synthetic question pair for the first augmented dataset by randomly selecting a question pair labeled as entailment from the first dataset

514
Output the first augmented dataset for training a machine-learning model

700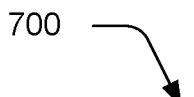

<div style="border:1px solid black">

702
Receive training data including a first set of training data associated with a first task and a second set of training data associated with a second task </div>

<div style="border:1px solid black">

704
Train a multitask machine-learning model having a first set of layers using the first set of training data associated with the first task and a second set of layers using the second set of training data associated with the second task <div style="border:1px solid black">

706
Multitask learning loss function defining differing amounts of parameter sharing between corresponding layers associated with the first and second tasks, respectively </div>

</div>

<div style="border:1px solid black">

708
Output a result of processing a subsequent input by the trained multitask machine-learning model <div style="border:1px solid black">

710
The result is a summary of text of the subsequent input, the result generated as part of long question understanding through use of the trained multitask machine learning model </div>

</div>

MULTITASK MACHINE-LEARNING MODEL TRAINING AND TRAINING DATA AUGMENTATION

BACKGROUND

Natural language understanding, as implemented by processing devices using machine learning, is tasked with understanding an intent underlying a text input. These techniques have been employed by computing devices in a wide variety of scenarios as part of artificial intelligence, including use of spoken commands, use by artificial assistants, text prediction, message routing, handsfree driving, and so forth.

One example of natural language understanding is question answering, in which, a machine-learning model is tasked with determining an intent behind what is being asked. The machine-learning model is then also tasked with locating an answer corresponding to that intent. Conventional techniques used by machine-learning model to perform question answering, however, while capable of processing relatively short inputs lack accuracy when confronted with long question understanding, e.g., multiple sentences. As such, operation of computing devices that implement these conventional techniques are hindered and often fail for their intended purpose in such scenarios.

SUMMARY

Multitask machine-learning model training and training data augmentation techniques are described. In one example, training is performed for multiple tasks simultaneously as part of training a multitask machine-learning model using question pairs. Examples of the multiple tasks include question summarization and recognizing question entailment, although other tasks are also contemplated. It has been found through testing using the techniques described herein that multitask machine-learning model training using both of these tasks together improves accuracy of each of the tasks, individually.

Further, a loss function is described that also improves accuracy as part of training the multitask machine-learning model. The loss function is configurable as a weighted loss function that is simultaneously optimized for both of the above tasks. The loss function also incorporates a parameter sharing loss that is configured to adjust an amount that parameters are shared between corresponding layers trained for the first and second tasks, respectively.

In an implementation, training data augmentation techniques are also employed, which also improves accuracy of training and subsequent use of the multitask machine-learning model. This is performable by synthesizing question pairs, automatically and without user intervention, to improve accuracy in model training.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 1 is an illustration of a digital medium environment in an example implementation that is operable to employ multitask machine-learning model training and training data augmentation techniques described herein.

FIG. 2 depicts a system in an example implementation showing operation of a training data augmentation module and a multitask machine learning system of FIG. 1 in greater detail.

FIG. 4 is a flow diagram depicting a procedure in an example implementation in which a second augmented dataset for a second task is generated based on a first dataset pertaining to a first task.

FIG. 5 is a flow diagram depicting a procedure in an example implementation in which a first augmented dataset for a first task is generated based on a second dataset pertaining to a second task.

FIG. 7 is a flow diagram depicting a procedure in an example implementation in which a multitask machine-learning model is trained.

DETAILED DESCRIPTION

Overview

Figure 3:
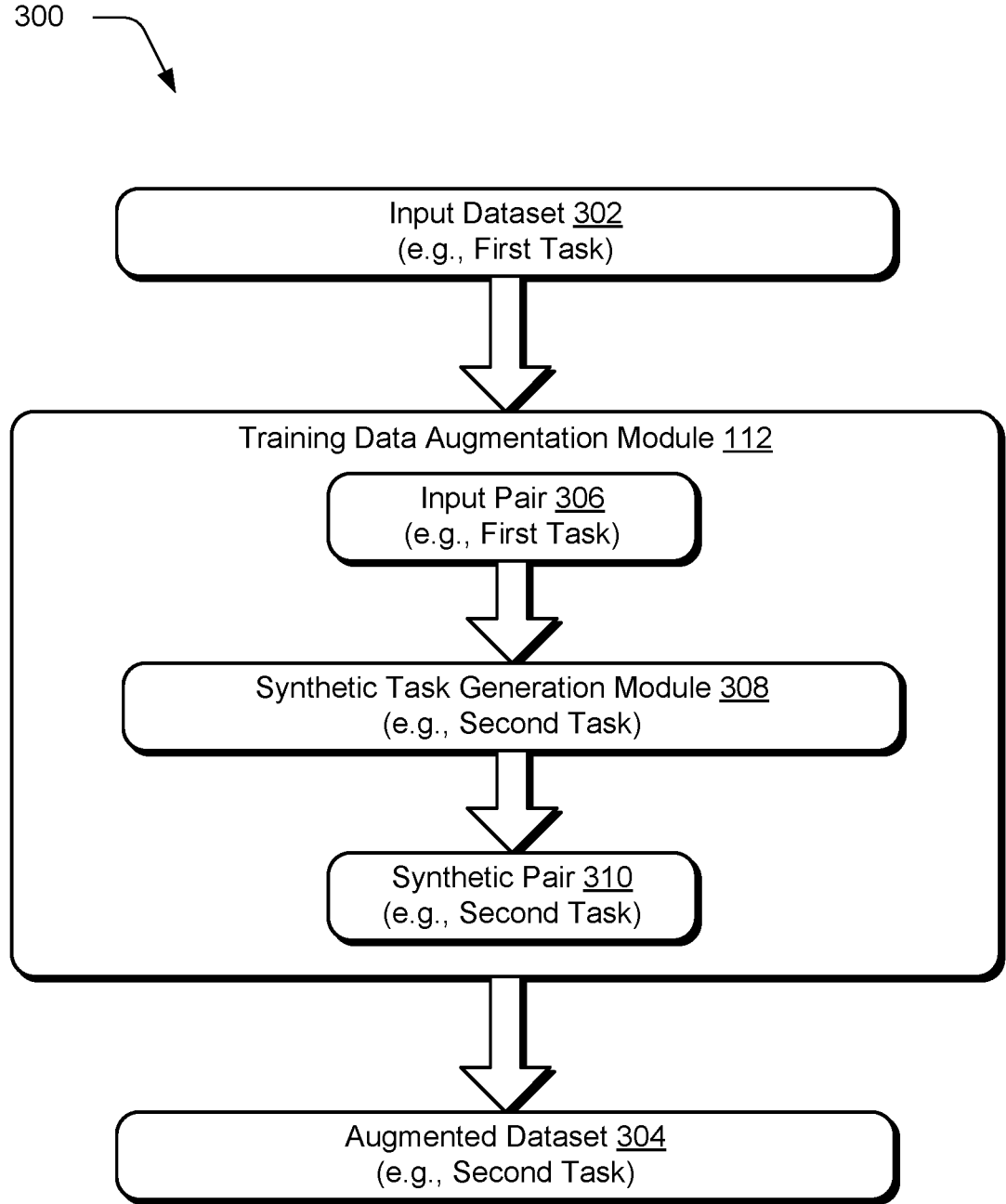
FIG. 3 depicts a system in an example implementation showing operation of a training data augmentation module of FIG. 2 in greater detail.

Natural language understanding techniques as implemented by machine-learning models find use in a variety of scenarios, an example of which is question answering techniques. In these techniques, the machine-learning model is tasked with determining an intent behind an input and from this intent locate an answer. A spoken utterance, for instance, is received by a computing device and converted to text using speech-to-text functionality. This text is then processed by a machine-learning model using natural language understanding techniques to determine an intent corresponding to this text. This intent is then used as a search query to find a corresponding answer, which is then returned as a result.

Conventional techniques to do so, however, are challenged by long detailed questions, which make it harder for computing devices that implement these techniques to provide sufficiently high recall in answer retrieval. As such, the challenges involved in long question understanding hinders operation of computing devices that implement these techniques. Long detailed questions, for instance, often include superfluous language that provides little insight into an underlying intent of the questions as a whole. Because of this, inaccuracies are common in real world scenarios, e.g., caused by potentially misleading information included in these questions.

Accordingly, multitask machine-learning model training and training data augmentation techniques are described that overcome these challenges. In one example, this is performed for multiple tasks simultaneously as part of training a multitask machine-learning model using question pairs. The multiple tasks in the following example include question summarization and recognizing question entailment (RQE) although other tasks are also contemplated.

Question summarization is a task of summarizing text, e.g., long questions into short, single-sentence question that capture and summarize information usable to identify an intent of the question and thus locate a correct answer. Recognizing question entailment is a binary classification task that is used to determine whether first and second questions are entailed, i.e., a first question entails a second question and the second question entails the first question. Entailment is defined between the first question and the second question such that answers to the second question provide complete and correct answers to the first question and answers to the first question provide correct answers to the second question, whether partially or completely.

It has been found through testing using the techniques described herein that multitask machine-learning model training using both of these tasks together improves accuracies of each of the tasks, individually. For example, the recognizing question entailment task is usable to teach question summarizers (i.e., question summarization generators) to distinguish salient information from peripheral details, and likewise question summarization benefits recognizing question entailment classifiers.

Further, a loss function is described that also improves accuracy as part of training the multitask machine-learning model. The loss function is configurable as a weighted loss function that is simultaneously optimized for both of the above tasks. Further the loss function also incorporates a parameter sharing loss (e.g., gradual soft parameter sharing) that is configured to adjust an amount that parameters are shared between corresponding layers trained for the first and second tasks, respectively, e.g., for the question summarization and recognizing question entailment tasks.

The amount of sharing, for instance, is decreased between sequential layer pairs, e.g., begins with a full amount of sharing and is decreased through successive layers until the parameters are not shared. Therefore, in this example, the parameter-sharing loss defines a constraint for parameters to be close, that is gradually lessened as proceeding through successive layers of the machine-learning model. This loss function has been shown to increase accuracy and improve operation of computing devices in training machine-learning models, further discussion of which is described in the following sections and shown in corresponding figures.

In an implementation, training data augmentation techniques are also employed, which also improves accuracy of training and subsequent use of the multitask machine-learning model. In practice, datasets usable for question/answer training are scarce. Further, conventional techniques used to create these datasets are costly and inefficient as involving manual processes and corresponding inaccuracies. Accordingly, training data augmentation is described in which training data is synthesized, automatically and without user intervention, to improve accuracy in model training. Further, these techniques address weaknesses and inaccuracies in conventional multitask learning in which each task involves a distinct dataset, often from a different domain. Rather, in the techniques described herein data augmentation techniques enable use of datasets in a same domain, which benefits performance in both tasks as further described below. Further discussion of these and other features is also included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ multitask machine-learning model training and training data augmentation techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" via a network 104 as described in FIG. 8.

The computing device 102 includes a question understanding system 106 that is configured to receive inputs as questions, and based on these inputs, return an answer. This is performed through use of question-and-answer data 108, which is illustrated as stored in a storage device 110. In order to do so, the question understanding system 106 is tasked with determining an intent of the question, and based on this intent, locate the answer, e.g., as a search query and search result using the question-and-answer data 108.

As previously described, conventional techniques are challenged in scenarios involving long question understanding in which question involving multiple sentences are the input. This is due in part to inclusion in the input of data that is not informative toward the underlying intent. Accordingly, the question understanding system 106 described herein is configured to incorporate multiple features to address these challenges.

In a first example, a training data augmentation module 112 is employed to generate synthetic training data that is configured to improve accuracy in machine-learning model training. Conventional question understanding datasets with long question are scarce and conventional techniques used to create these datasets are complex and costly to create through manual processes, which also introduce inaccuracies. Accordingly, the training data augmentation module 112 is configured to augment existing datasets to create a synthetic training dataset. The synthetic training dataset, for instance, supports multitask learning through use of question pairs for the multiple tasks. The training data augmentation module 112 therefore is configured to generate synthetic pairs, e.g., that exhibit entailment or do not exhibit entailment. This expands an amount of training data available to train the machine-learning model and as a consequence also improves accuracy of the model. Further discussion of operation of the training data augmentation module 112 is described in relation to FIGS. 2-5.

In a second example, a multitask machine learning system 114 is trained (e.g., using the training data generated by the training data augmentation module 112) for use in implementing the question answer techniques. The multitask machine learning system 114 implements training of two tasks, simultaneously and in parallel while sharing parameters. Examples of these tasks are represented using a summarization module 116 and an entailment module 118.

Question summarization, as implemented by the summarization module 116, is a generation task of summarizing input text into a short, single-sentence question that captures and summarizes information usable to identify an intent of the question and thus locate a correct answer. Recognizing question entailment, as implemented by the entailment module 118, is a binary classification task that is used to determine whether first and second questions are entailed, i.e., a first question entails a second question and the second question entails the first question. Entailment is defined between the first question and the second question such that answers to the second question provide complete and correct answers to the first question and answers to the first question provide correct answers to the second question, whether partially or completely.

It has been found through testing as part of the techniques described herein that multitask machine-learning model training using both question summarization and question entailment together improves accuracies of each of the tasks, individually. For example, the recognizing question entailment task is usable to teach question summarizers (i.e., question summarization generators) to distinguish salient information from peripheral details, and likewise question summarization benefits recognizing question entailment classifiers.

As depicted in a user interface 120 displayed by the display device 122 in FIG. 1, for instance, an input is received regarding a consumer health question, e.g., Morgellon Disease. The input includes text as part of a long question stating that:

> It appears as if I have had this horrible disease for many, many years and it is getting worse. I am trying to find a physician or specialist in the North Carolina area who can treat me for this medical/mental disease. It seems as if this disease has no complete treatment and it probably involves a long term disability.

Thus, the input is a long question involving multiple sentences, each having varying degrees of relevance to an underlying intent of the question. Through use of the multitask machine learning system 114, however, a result is generated of:

> Where can I find a physician or specialist in North Carolina who can treat Morgellon Disease.

Thus, in this example recognizing question entailment as part of question summarization provides an ability to generate summaries having increased relevancy as compared with the input and other conventional techniques as described in the following sections.

FIG. 2 depicts a system 200 in an example implementation showing operation of the training data augmentation module 112 and the multitask machine learning system 114 in greater detail. The training data augmentation module 112 is illustrated as generating synthetic training data 202, which is provided as an input to the multitask machine learning system 114. As described above, the multitask machine learning system 114 is configured for multitask training for a first task 204 (e.g., a question summarization task) and a second task 206, e.g., a recognizing question entailment (RQE) task. This is implemented by a summarization module 116 and an entailment module 118 having respective encoders 208, 210 and decoders 212, 214 having layers that form a machine-learning model, e.g., a multitask machine-learning model.

In this example, multitask learning is implemented using question summarization and RQE, where the input to both tasks is a pair of questions. The first question is called a Consumer Health Question (CHQ) and the second question is called a Frequently Asked Question (FAQ). The CHQ is input by a patient and is usually longer and has informal, whereas the FAQ is usually a single-sentence question written by an expert. Thus, the CHQ forms a first collection of questions and answers and the FAQ forms a second collection of questions and answers, in which the questions and answers of the CHQ are typically longer than the questions and answers of the FAQ. The multitask machine learning system 114 implements both tasks in order to match a CHQ to an FAQ, and ultimately to an expert-written answer that matches the FAQ.

To do so, the multitask machine learning system 114 establishes equivalence between question pairs in question summarization and RQE datasets. This equivalence is then used as a basis by the training data augmentation module 112 to generate the synthetic training data 202 for data augmentation of training data by augmenting data between the datasets. The multitask machine learning system 114 then utilizes a shared loss function 216 to train the summarization module 116 and entailment module 118.

Consider an example involving a first pair of questions "C" and "F," where "C" is a consumer health question (CHQ) and "F" is a frequently asked question. As described above, "C" is a long question, e.g., typically involves a plurality of sentences. For entailment, "F" is entailed to retrieve correct answers to "C," if and only if answers to "F" are correct answers to "C." Therefore, "F" is entailed to retrieve correct answers to "C," if and only if every answer to "F" is also a correct answer to "C," whether partially or completely. Consequently, it follows that question "F" is a good summary of question "C," if an only if question "C" entails question "F."

This definition is used as a basis by the training data augmentation module 112 to generate the synthetic training data 202 by creating either entailed or non-entailed pairs of questions that are used to train the multitask machine learning system 114 for the first and second tasks 204, 206. In this way, operation of the multitask machine learning system 114 is improved, further discussion of which is included in the following sections.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Training Data Augmentation

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

FIG. 3 depicts a system 300 in an example implementation showing operation of the training data augmentation module 112 of FIG. 2 in greater detail. As previously described, question understanding datasets with long questions are scarce, and high-quality datasets creation is complex and costly to perform. Accordingly, the training data augmentation module 112 is employed to receiving an input dataset 302 (e.g., associated with a first task) to create an augmented dataset 304, e.g., for a second task. In other words, this is performed to augment existing datasets in one of the two tasks to create a synthetic dataset of the same size for the other task.

To do so, the training data augmentation module 112 employs a two-way data augmentation algorithm leveraging the definition of equivalence described above to support training of a machine-learning model simultaneously in a multitask setting, e.g., as a multitask machine-learning model. An input pair 306 relating to a first task, for instance is received by a synthetic task generation module 308 which is then tasked with generating a synthetic pair 310 for inclusion in an augmented dataset 304 for the second task. The synthetic pair 310, for instance, is generated as a positive sample that exhibits entailment or a negative sample that does not exhibit entailment. As a result, the input dataset 302 for the first task is used to augment a second dataset for a second task (e.g., as the augmented dataset 304) through addition of the synthetic pair 310. This technique also addresses a weakness in conventional multitask machine learning in which each task involves a distinct dataset, often from a different domain. In the techniques described herein, data augmentation supports use of datasets in the same domain, which is beneficial to performance in both tasks.

FIG. 4 depicts a procedure 400 in an example implementation in which a second augmented dataset for a second task is generated based on a first dataset pertaining to a first task. In the following discussion, the first task corresponds to question summarization task (i.e., question summarization generation using machine learning) and the second task is a recognizing question entailment (RQE) task, i.e., RQE classification. Therefore, in this example equivalent RQE pairs of questions are synthesized based on question pairs from a summarization dataset.

To generate a second augmented dataset for a second task (block 402), a first dataset is obtained by the training data augmentation module 112 having question pairs relating to a first task (block 404). The training data augmentation module 112 then selects an input question pair from the first dataset (block 406) and makes a determination as to whether a synthetic question pair for a second dataset is to be labeled as "entailment" or "not entailment" (block 408), e.g., with equal probability.

Responsive to a determination by the training data augmentation module 112 that the synthetic question pair is to be labeled as entailment, the synthetic question pair is generated for the second augmented dataset as matching the input question pair (block 410). Responsive to a determination by the training data augmentation module 112 that the synthetic question pair is to be labeled as not entailment, the synthetic question pair for the second augmented dataset is generated as including a first question from the first dataset taken from the input question pair and a second question randomly selected form the second dataset (block 412). The second augmented dataset is then output by the training data augmentation module 112 for use in training a machine learning model (block 414).

Continuing the above example, the first task corresponds to question summarization task (i.e., question summarization generation using machine learning) and the second task is a recognizing question entailment (RQE) task, i.e., RQE classification. RQE pairs of questions are synthesized by the training data augmentation module 112 based on question pairs from a summarization dataset. For each existing summarization pair from the summarization dataset, the training data augmentation module 112 first chooses with equal probability whether the equivalent RQE pair is to labeled as "entailment" or "not entailment." For "entailment," the above entailment definition is used to generate an RQE pair identical to the summarization pair. If "not entailment," then question "F" is not a summary of question "C" if and only if question "C" does not entail question "F." Therefore, in order to generate an equivalent RQE question pair labeled as "not entailment," the training data augmentation module 112 the synthesized question pair (e.g., recognizing question entailment (RQE) question health question (CHQ)) includes a consumer health question (CHQ) from the summarization pair, and the recognizing question entailment (RQE) frequently asked question (FAQ) is randomly selected from a distinct question pair from the same dataset split. Similar techniques are also usable to generate the first augmented dataset.

FIG. 5 depicts a procedure 500 in an example implementation in which a first augmented dataset for a first task is generated based on a second dataset pertaining to a second task. This procedure 500 mimics the procedure 400 of FIG. 4, but differs in how the negative sample is generated, e.g., the "not entailment" question pair.

To generate a first augmented dataset for a first task (block 502), a second dataset is obtained by the training data augmentation module 112 having question pairs relating to a second task (block 504). The training data augmentation module 112 selects an input question pair from the second dataset (block 506) and makes a determination as to whether a synthetic question pair for a first dataset is to be labeled as "entailment" or "not entailment" (block 508), e.g., with equal probability.

Responsive to a determination by the training data augmentation module 112 that the synthetic question pair is to be labeled as entailment, the synthetic question pair is generated for the first augmented dataset as matching the input question pair (block 510). Responsive to a determination by the training data augmentation module 112 that the synthetic question pair is to be labeled as not entailment, however, the synthetic question pair for the first augmented dataset is generated as including a randomly selected and distinct question pair labeled as entailment from the first dataset (block 512), e.g., from a same dataset split. The first augmented dataset is then output by the training data augmentation module 112 for using in training a machine learning model (block 514).

Continuing with the above example, inversely, for the RQE dataset, equivalent summarization pairs are also created. For each existing RQE pair, two cases are considered, e.g., "entailment" and "not entailment." If the RQE pair is labeled as entailment, an identical summarization pair is created as described in FIG. 4. If the RQE pair is labeled as "not entailment," then following the entailment definition, a summarization pair is created by the training data augmentation module 112 that is identical to a randomly selected and distinct RQE pair labeled as entailment from the same dataset split, i.e., the RQE dataset. This training data, as augmented, is then used to train the multitask machine-learning model as described in the following section.
Multitask Machine-Learning Model Training The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 6-7.

Conventional multitask learning techniques involving summarization and entailment optimize for the objectives of the different tasks by alternating between them. This alternating multitask training follows a ratio between the different tasks that is dependent on a size of the dataset of each task. For example, a ratio of "10:1" means training for ten batches on a first task, and then for one batch on a second task. In the techniques described herein, however, the multitask machine-learning model the objective for both tasks is optimized simultaneously. Therefore, conventional use of ratios is avoided as this training technique does not involving alternating between objectives and the resulting datasets from the training data augmentation module 112 are of equal size in the implementation described above.

Further, conventional multitask machine-learning models are trained using generation tasks, e.g., for both entailment generation and question generation. In the system 600 shown in FIG. 6, however, an architecture is employed to implemented a multitask machine-learning model that is configured to optimize for a question summarization generation task 602 and a recognizing question entailment (RQE) classification task 604. The question summarization generation task 602 and the RQE classification task 604 both utilize a shared encoder 606 and have separate decoders, e.g., a summarization decoder 608 and a classification decoder 610.

The shared encoder 606, as part of the question summarization generation task 602, receives as an input a first augmented dataset 612, e.g., for consumer health questions (CHQ). The summarization decoder 608 receives as an input the second augmented dataset 614, e.g., the FAQ. For the RQE classification task 604, both the shared encoder 606 and the classification decoder 610 receive the first and second augmented datasets 616, e.g., the CHQ and the FAQ. A classification head 618 is added to the RQE classification task 604, which receives an output from a last layer of the classification decoder 610, as it attends over each of the decoder and encoder positions.

The shared encoder 606 includes a plurality of layers, respective, that incorporate "hard" sharing that are implemented together. The summarization decoder 608 includes a plurality of layers, examples of which are illustrated as a first layer 620(1), second layer 620(2), third layer 620(3), fourth layer 620(4), fifth layer 620(5), . . . , through "Nth" layer 620(N). Likewise, the classification decoder 610 includes a plurality of layers, examples of which are illustrated as a first layer 622(1), second layer 622(2), third layer 622(3), fourth layer 622(4), fifth layer 622(5), . . . , through "Nth" layer 622(N).

A single loss function is optimized that combines objectives of both tasks. The single loss function, for instance, is implemented as a weighted sum of the negative log-likelihood loss 624 of a summarization objective, and a cross-entropy loss 626 of binary cross-entropy classification objective of the RQE classification task 604. More formally, given a consumer health question embedding "x," the corresponding FAQ embedding "y," and the entailment label "$1_{entail} \in \{0, 1\}$," the following multitask learning loss function is optimized as:

$$\mathcal{L}_{MTL}(\theta) = -\lambda * \log p(y \mid x; \theta) + (1 - \lambda) * BCE([x; y], 1_{entail}; \theta)$$

where "BCE" is binary cross entropy, and "$\lambda$" is a hyperparameter between "0" and "1."

In hard parameter sharing, a machine-learning model shares hidden layers across each of the tasks. Task specific layers (e.g., through use of classification heads) are used for specialization in each task. In soft parameter sharing, each task has its own set of parameters, which are then regularized to reduce differences between shared layers.

Figure 6:
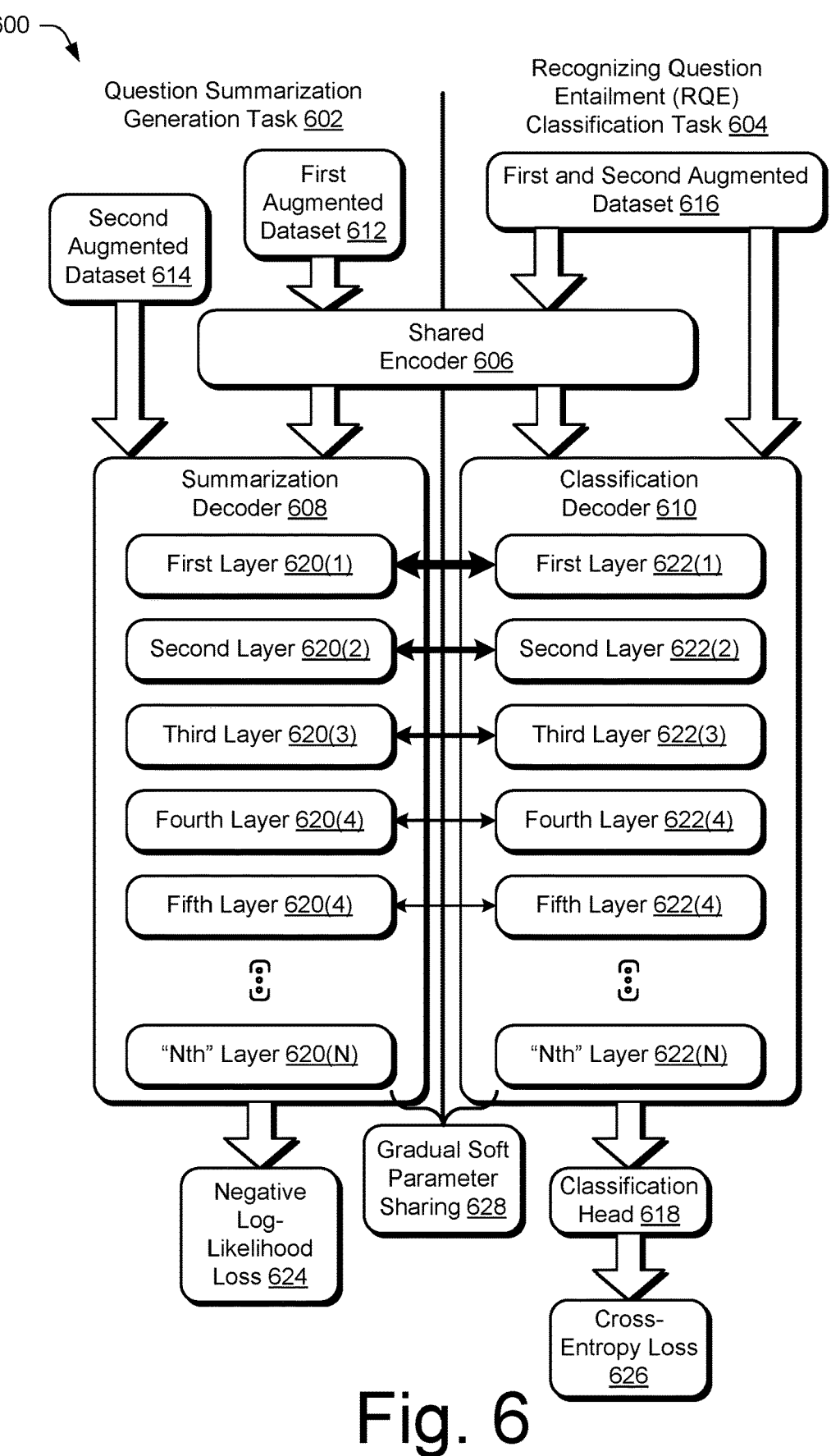
FIG. 6 depicts a system having an architecture implementing a multitask machine-learning model that is configured to optimize for a question summarization generation task and a recognizing question entailment (RQE) classification task.

In the illustrated system 600 having an architecture of a multitask machine-learning model of FIG. 6, a hybrid approach is implemented. Hard parameter sharing is utilized for the shared encoder 606. However, gradual soft parameter sharing 628 is employed for the layers of the summarization decoder 608 and the classification decoder 610. Gradual soft parameter sharing 628 defines differing amounts of parameter sharing between corresponding layers associated with the respective tasks. In the illustrated example, total amounts of parameters are shared for the first layers 620(1), 622(2), the amount of which is decreased through successive layers such that at the "Nth" layers 620(N), 622(N) parameters are not shared. Thus, respective amounts of sharing are illustrated in FIG. 6 through decreasing line weights of arrows connecting respective layers. In this way, gradual soft parameter sharing 628 defines a smooth transition from hard parameter sharing to task-specific layers. It is a soft parameter sharing approach that is gradually toned down from the first layers 620(1), 622(1) of the decoders to the last layers, which are entirely task-specific.

In an implementation, gradual soft parameter sharing 628 is performed by constraining decoder parameters to be close by penalizing associated "l2" distances, and the higher the layer the looser the constraint. Given a decoder with "N" layers, for instance, a gradually soft parameter-sharing loss term is defined as follows:

$$\mathcal{L}_{GS}(\theta) = \gamma * \sum_{n=1}^{N-1} \left( e^{\frac{N-n}{N}} - 1 \right) \left\| \theta_{dec,n}^{QS} - \theta_{dec,n}^{RQE} \right\|^2$$

where "$\gamma$" is a hyperparameter, $$\theta_{dec,n}^{QS}$$

represents the decoder parameters for the question summarization at the "Nth" layer, and likewise $$\theta_{dec,n}^{RQE}$$

represents the decoder parameters for the RQE task at the "Nth" layer. The multitask machine-learning model is configured to iterate from the first to the "N−1" layer, as the "Nth" layer in this example is entirely task-specific and unconstrained. A variety of other examples are also contemplated.

FIG. 7 depicts a procedure 700 in an example implementation in which a multitask machine-learning model is trained. To begin, training data is received including a first set of training data associated with a first task and a second set of training data associated with a second task (block 702), e.g., customer health queries associated with a question summarization task and frequently asked questions associated with an RQE classification task.

A multitask machine-learning model is trained. The multitask machine-learning model has a first set of layers that are trained using the first set of training data associated with the first task and a second set of layers trained using the second set of training data associated with the second task (block 704). As part of this, a multitask learning loss function is utilized defining differing amounts of parameter sharing between corresponding layers associated with the first and second tasks, respectively (block 706). The multitask learning loss function, for instance, is implemented using gradual soft parameter sharing 628.

A result is output of processing a subsequent input by the trained multitask machine-learning model (block 708). In an implementation, the result is a summary of text of the subsequent input. The result is generated as part of long question understanding through use of the trained multitask machine learning model (block 710). These techniques have been shown to support numerous technological advances and solutions to technical problems not available in conventional techniques, and as such improve computing device 102 operation.

For example, improved performance has been demonstrated in low-resource settings. The techniques described herein involving gradual soft parameter sharing 628 and data augmentation have been compared with a conventional single-task learning baseline on four low-resource settings. For each dataset, training data is limited to a subset of 50, 100, 500 or 1000 datapoints, while keeping the same training settings. To avoid selection bias, four random and distinct subsets are selected per low-resource setting. The results show that the techniques described herein exhibit improved performance in low-resource settings over conventional single-task learning techniques. In particular, for each of the four datasets, the scores of the single-task learning baseline for 100 and 1000 datapoints are lower than or roughly equal to the scores of the techniques described herein for a training subset of half the size, e.g., 50 and 500 datapoints respectively. This indicates that the described techniques performance increase is a result of both the data augmentation as well as the gradual soft parameter sharing 628.

Example System and Device

Figure 8:
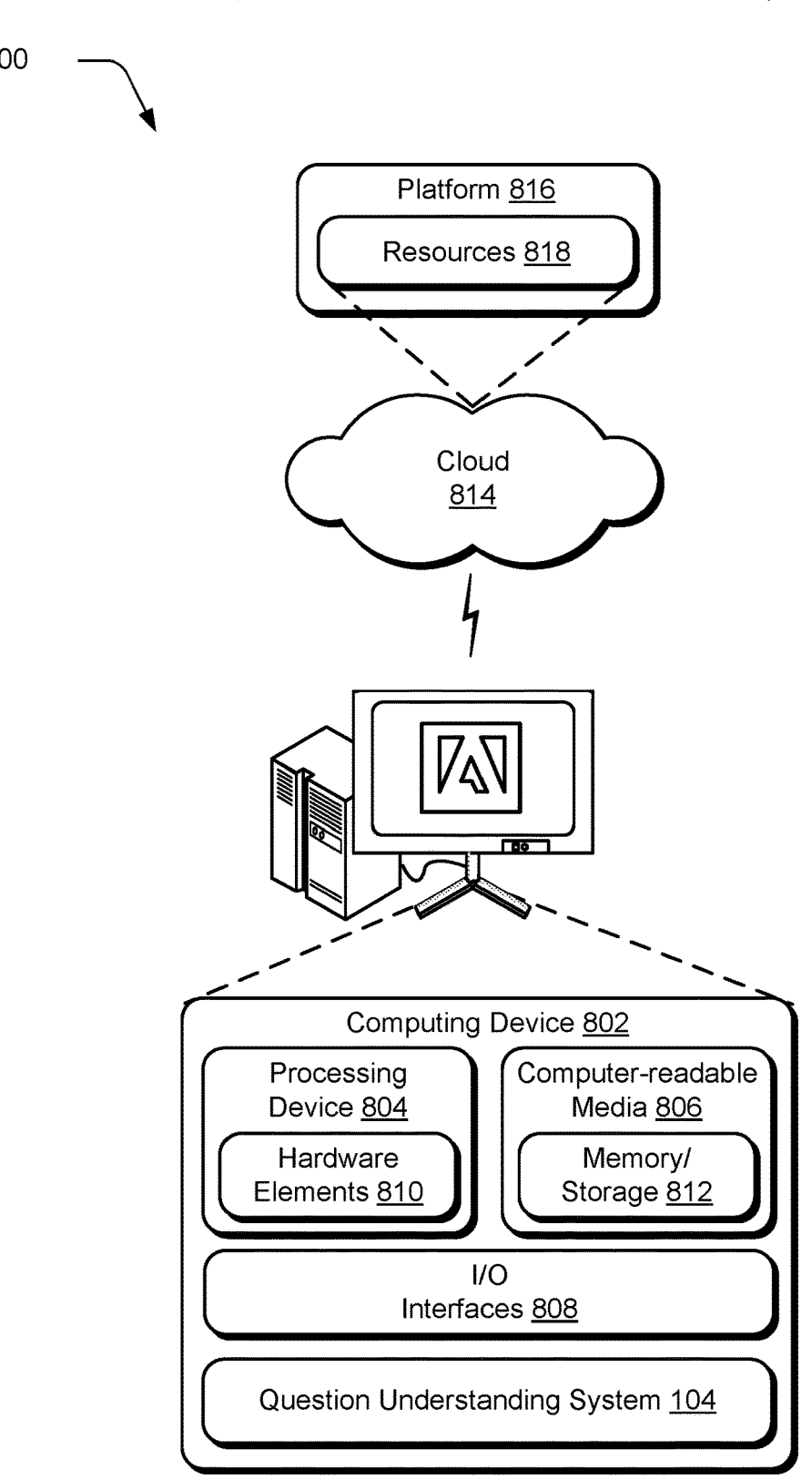
FIG. 8 illustrates an example system that includes an example computing device that is representative of one or more computing systems and/or devices that implement the various techniques described herein.

FIG. 8 illustrates an example system generally at 800 that includes an example computing device 802 that is representative of one or more computing systems and/or devices that implement the various techniques described herein. This is illustrated through inclusion of the network 104. The computing device 802 is configurable, for example, as a server of a service provider, a device associated with a client (e.g., a client device), an on-chip system, and/or any other suitable computing device or computing system.

The example computing device 802 as illustrated includes a processing device 804, one or more computer-readable media 806, and one or more I/O interface 808 that are communicatively coupled, one to another. Although not shown, the computing device 802 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 804 is representative of functionality to perform one or more operations using hardware. Accordingly, the processing device 804 is illustrated as including hardware element 810 that is configurable as processors, functional blocks, and so forth. This includes implementation in hardware as an application specific integrated circuit or other logic device formed using one or more semiconductors. The hardware elements 810 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 806 is illustrated as including memory/storage 812. The memory/storage 812 represents memory/storage capacity associated with one or more computer-readable media. The memory/storage 812 includes volatile media (such as random access memory (RAM)) and/or nonvolatile media (such as read only memory (ROM), Flash memory, optical disks, magnetic disks, and so forth). The memory/storage 812 includes fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 802. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 810. The computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing device 804. The instructions and/or functions are executable/operable by one or more articles of manufacture (for example, one or more computing devices 802 and/or processing devices 804) to implement techniques, modules, and examples described herein.

The techniques described herein are supported by various configurations of the computing device 802 and are not limited to the specific examples of the techniques described herein. This functionality is also implementable all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 include applications and/or data that can be utilized while computer processing is executed on servers that are remote from the computing device 802. Resources 818 can also include services provided over the Internet and/or through a subscriber network, such as a cellular or Wi-Fi network.

The platform 816 abstracts resources and functions to connect the computing device 802 with other computing devices. The platform 816 also serves to abstract scaling of resources to provide a corresponding level of scale to encountered demand for the resources 818 that are implemented via the platform 816. Accordingly, in an interconnected device embodiment, implementation of functionality described herein is distributable throughout the system 800. For example, the functionality is implementable in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

receiving, by a processing device, training data including a first set of training data associated with a first task involving summarization and a second set of training data associated with a second task involving classification;

training, by the processing device, a multitask machine-learning model having a first set of layers using the first set of training data associated with the first task involving summarization and a second set of layers using the second set of training data associated with the second task involving classification, the training using a multitask learning loss function defining differing amounts of parameter sharing that decreases through successive said layers between the first and second set of layers associated with the first and second tasks, respectively; and outputting, by the processing device, a result of processing a subsequent input by the trained multitask machine-learning model.

2. The method as described in claim 1, wherein the first task involving summarization is a question summarization task and the second task involving classification is a recognizing question entailment task.

3. The method as described in claim 2, wherein the training of the recognizing question entailment task includes learning entailment between a first question in the first set of training data and a second question in the second set of training data.

4. The method as described in claim 3, wherein the entailment is defined between first question and the second question such that answers to the second question provide complete and correct answers to the first question and answers to the first question provide correct answers to the second question.

5. The method as described in claim 1, wherein the first set of training data includes a first collection of questions and answers and the second set of training data includes a second collection of questions and answers.

6. The method as described in claim 5, wherein at least one of the first or second set of training data is configured as frequently asked questions (FAQ).

7. The method as described in claim 1, wherein the first set of layers are implemented using a first decoder of a multitask machine learning model and the second set of layers are implemented using a second decoder of the multitask machine learning model.

8. The method as described in claim 7, wherein the multitask machine learning model further includes a shared encoder for the first and second tasks.

9. The method as described in claim 1, wherein the multitask learning loss function defines a parameter sharing loss as increasing or decreasing between sequential pairs of the layers.

10. The method as described in claim 1, wherein the result is a summary of text of the subsequent input, the result generated as part of long question understanding through use of a trained multitask machine learning model.

11. The method as described in claim 10, wherein the subsequent input as part of the long question understanding involves a plurality of sentences.

12. A system comprising:
a processing device; and
a non-transitory computer-readable storage medium storing instructions that, responsive to execution by the processing device, causes the processing device to perform operations including:
receiving training data including a first set of training data associated with a first task involving summarization and a second set of training data associated with a second task involving classification;
training a multitask machine-learning model having a shared encoder, a first set of layers of a summarization decoder using the first set of training data associated with the first task involving summarization and a second set of layers of a classification decoder using the second set of training data associated with the second task involving classification, the training using a multitask learning loss function defining differing amounts of parameter sharing between corresponding said layers of the summarization decoder and the classification decoder associated with the first and second tasks, respectively; and outputting a result of processing a subsequent input by the trained multitask machine-learning model.

13. The system as described in claim 12, wherein the first task is a question summarization task and the second task is a recognizing question entailment task.

14. The system as described in claim 13, wherein the training of the recognizing question entailment task includes learning entailment between a first question in the first set of training data and a second question in the second set of training data.

15. The system as described in claim 13, wherein the entailment is defined between first question and the second question such that answers to the second question provide complete and correct answers to the first question and answers to the first question provide correct answers to the second question.

16. The system as described in claim 12, wherein the first set of training data includes a first collection of questions and answers and the second set of training data includes a second collection of questions and answers.

17. One or more non-transitory computer-readable storage media storing instructions that, responsive to execution by a processing device, causes the processing device to perform operations comprising:
receiving training data including a first set of training data associated with a first task involving summarization and a second set of training data associated with a second task involving classification;
training a multitask machine-learning model having a first set of layers of a summarization decoder using the first set of training data associated with the first task involving summarization and a second set of layers of a classification decoder using the second set of training data associated with the second task involving classification, the training using a multitask learning loss function defining differing amounts of parameter sharing that decreases through successive said layers between the first and second set of layers associated with the first and second tasks, respectively; and
outputting a result of processing a subsequent input by the trained multitask machine-learning model.

18. The one or more non-transitory computer-readable storage media as described in claim 17, wherein the first task is a question summarization task and the second task is a recognizing question entailment task.

19. The one or more non-transitory computer-readable storage media as described in claim 18, wherein the training of the recognizing question entailment task includes learning entailment between a first question in the first set of training data and a second question in the second set of training data.

20. The one or more non-transitory computer-readable storage media as described in claim 19, wherein the entailment is defined between first question and the second question such that answers to the second question provide complete and correct answers to the first question and answers to the first question provide correct answers to the second question.

21. The one or more non-transitory computer-readable storage media as described in claim 17, wherein the first set of training data includes a first collection of questions and answers and the second set of training data includes a second collection of questions and answers.

* * * * *